(12) United States Patent
Pan

(10) Patent No.: US 7,583,947 B2
(45) Date of Patent: Sep. 1, 2009

(54) METHOD AND SYSTEM FOR SINGLE SIDEBAND MIXING RECEIVER ARCHITECTURE FOR IMPROVING SIGNAL QUALITY

(75) Inventor: Meng-An (Michael) Pan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 429 days.

(21) Appl. No.: 10/977,869

(22) Filed: Oct. 29, 2004

(65) Prior Publication Data
US 2006/0094388 A1   May 4, 2006

(51) Int. Cl.
*H04B 1/10* (2006.01)

(52) U.S. Cl. .................. 455/302; 455/296; 455/323

(58) Field of Classification Search .............. 455/296, 455/302–307, 310, 313–318, 323–334
See application file for complete search history.

(56) References Cited

U.S. PATENT DOCUMENTS

| 4,736,390 | A  | * | 4/1988 | Ward et al. ............ 375/316 |
| 6,343,211 | B1 | * | 1/2002 | Thodesen et al. .......... 455/317 |
| 7,184,724 | B1 | * | 2/2007 | Ashby et al. ............. 455/130 |
| 2002/0004372 | A1 | * | 1/2002 | Gharpurey ............... 455/78 |
| 2002/0032016 | A1 | * | 3/2002 | Ji ....................... 455/326 |
| 2003/0129959 | A1 | * | 7/2003 | Gilmore ................. 455/333 |
| 2007/0112904 | A1 |   | 5/2007 | Kasperkovitz |

* cited by examiner

*Primary Examiner*—Blane J Jackson
(74) *Attorney, Agent, or Firm*—McAndrews, Held & Malloy, Ltd.

(57) ABSTRACT

Certain embodiments of the invention may be found in a method and system for single sideband mixing receiver architecture for improving signal quality in an RF communication system. An embodiment of the invention may mix a first input signal with a first local oscillator signal, via a first mixer, to generate a first mixed output signal. It may also mix a second input signal with a second local oscillator signal, via a second mixer, to generate a second mixed output signal. It may then generate a single sideband signal by adding the first mixed output signal and the second mixed output signal. The removal of one of two sidebands may reduce noise at the desired signal, since the removed sideband may have been at the same frequency as the desired signal.

44 Claims, 8 Drawing Sheets

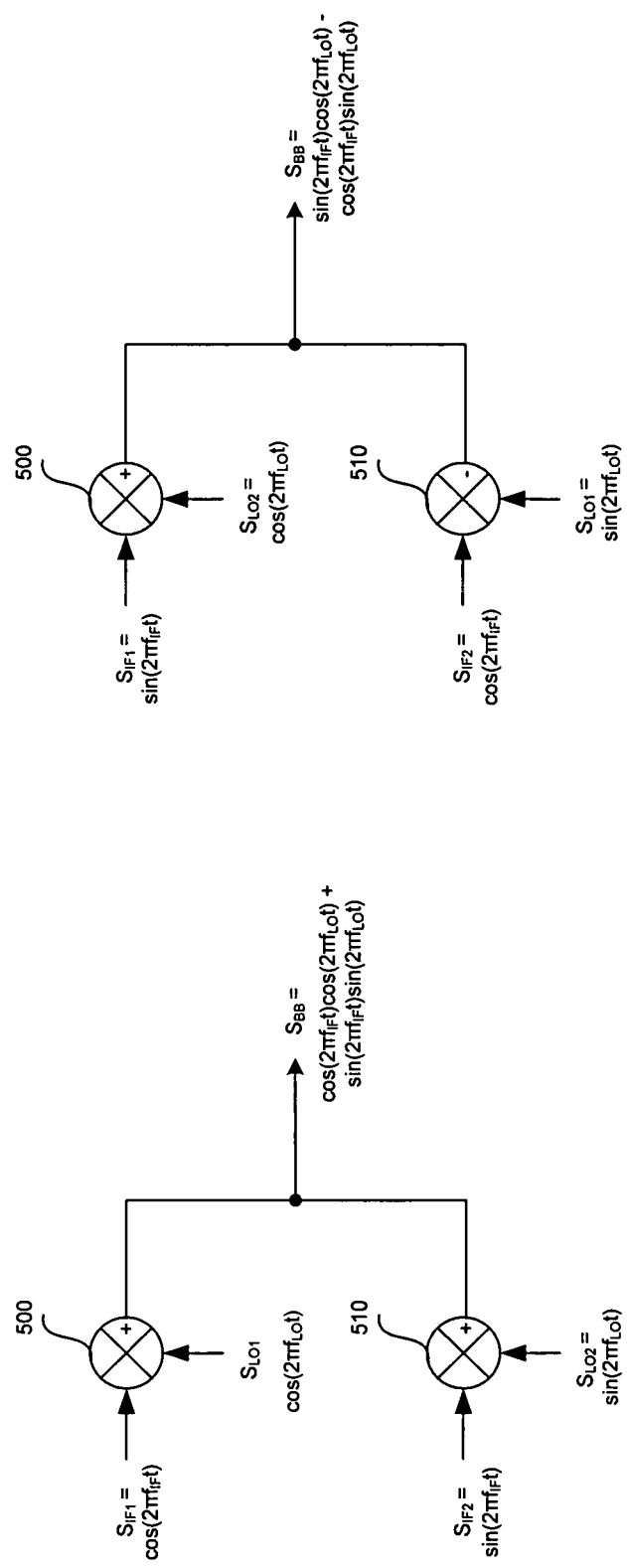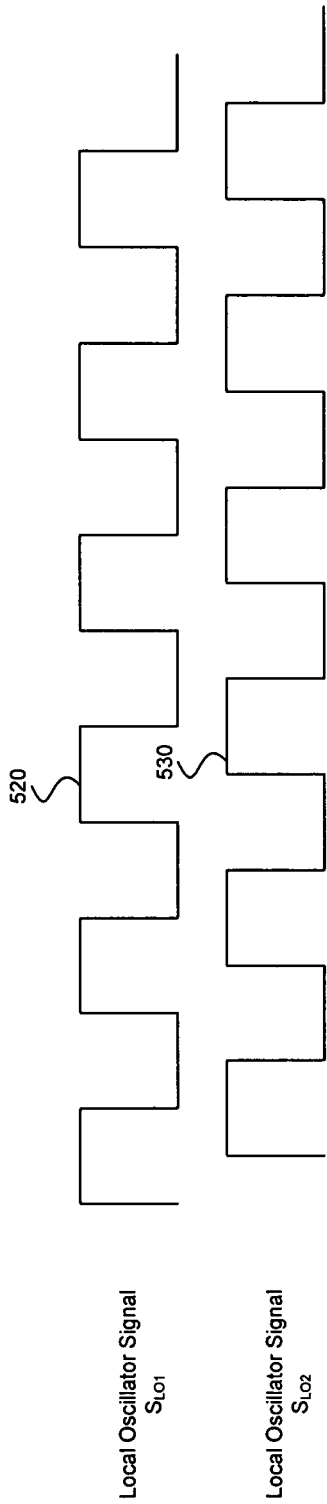
FIG. 5a
FIG. 5b
FIG. 5c

METHOD AND SYSTEM FOR SINGLE SIDEBAND MIXING RECEIVER ARCHITECTURE FOR IMPROVING SIGNAL QUALITY

CROSS-REFERENCE TO RELATED APPLICATIONS/INCORPORATION BY REFERENCE

This application is related to the following applications, each of which is incorporated herein by reference in its entirety for all purposes:

U.S. patent application Ser. No. 10/976,976 filed Oct. 29, 2004;
U.S. patent application Ser. No. 10/976,977 filed Oct. 29, 2004;
U.S. patent application Ser. No. 10/977,000 filed Oct. 29, 2004;
U.S. patent application Ser. No. 10/976,575 filed Oct. 29, 2004;
U.S. patent application Ser. No. 10/977,464 filed Oct. 29, 2004;
U.S. patent application Ser. No. 10/977,798 filed Oct. 29, 2004;
U.S. patent application Ser. No. 10/977,005 filed Oct. 29, 2004;
U.S. patent application Ser. No. 10/977,771 filed Oct. 29, 2004;
U.S. patent application Ser. No. 10/977,868 filed Oct. 29, 2004;
U.S. patent application Ser. No. 10/976,666 filed Oct. 29, 2004;
U.S. patent application Ser. No. 10/977,631 filed Oct. 29, 2004;
U.S. patent application Ser. No. 10/976,639 filed Oct. 29, 2004;
U.S. patent application Ser. No. 10/977,210 filed Oct. 29, 2004;
U.S. patent application Ser. No. 10/977,872 filed Oct. 29, 2004;
U.S. patent application Ser. No. 10/977,874 filed Oct. 29, 2004; and
U.S. patent application Ser. No. 10/976,996 filed Oct. 29, 2004.

FIELD OF THE INVENTION

Certain embodiments of the invention relate to receiving RF signals. More specifically, certain embodiments of the invention relate to a method and system for single sideband mixing receiver architecture for improving signal quality.

BACKGROUND OF THE INVENTION

In some conventional systems, a radio frequency (RF) signal may be converted to an intermediate frequency (IF), and then from IF to a baseband signal, where the IF may be in the megahertz range. Generally, the RF signal may be mixed with a local oscillator signal that results in two sideband signals that are the sum of the frequencies of the two signals and the difference of the frequencies of the two signals. One of the two sideband signals may be chosen as an IF signal, and this IF signal may be the same for all received RF signals. Therefore, a radio that may receive a plurality of channels, such as an AM or FM radio, may tune to a particular station by changing the local oscillator signal frequency such that the IF remains constant. With a constant IF, most of the receive path may be common in the receiver.

Today, much of radio receiver development may be driven mostly by a great demand for mobile wireless communication devices, including handsets. With the ever-decreasing size of mobile handsets, capacities of smaller batteries may be an issue. As most of these handsets may utilize complementary metal-oxide semiconductor (CMOS) technology for analog-to-digital conversion, and for much of the processing of voice and data signals, a very important factor to consider is that it may be advantageous for CMOS devices to operate at lower frequencies. This may be crucial since CMOS devices have power dissipation directly related to the speed at which the CMOS devices switch. The faster the frequencies, the faster the CMOS device switching speed, and therefore, the greater the amount of power consumed. Therefore, receivers may be designed to downconvert the high frequency RF, which may be in gigahertz range, to a lower frequency, preferably to a baseband frequency, as quickly as possible.

As a result, some receivers may utilize chips for digitally processing baseband signals, and may expect to receive the baseband signal, rather than an IF signal. To meet this need, some receiver architectures, for example, direct-conversion receivers, attempt to eliminate IF by converting directly from RF to baseband. This method of direct conversion reduces power consumption by not processing IF signals, and also reduces cost by not having to provide circuitry for processing the IF signals. However, with direct-conversion receivers, the reduced power consumption may be offset by strong drawbacks, such as DC-offset generation, 1/f noise, I/Q mismatch, excessive flicker noise in the baseband, and local oscillator (LO) leakage. In addition, a digital signal processor (DSP) may be required to perform complex digital processing of the digital signal for filtering and downconverting from the RF frequency.

If a measured signal-to-noise ratio (SNR) is less than a desired SNR, the DSP may need to perform, for example, distortion cancellation or other SNR reduction or mitigation function. Additionally, during direct conversion a majority of gain and filtering may be performed in a frequency band from DC to the signal bandwidth. In this process, a signal path's intrinsic DC offsets may be amplified. The dynamic range of the circuit may thereby be degraded. In addition, a DC offset may be created if the LO signal leaks to the RF front end and self-mixes. Some systems, for example, GSM systems, may use modulation and system synchronization techniques that require DC information, therefore, it may not be feasible to simply remove the DC component. Rather, complex DSP processing may be required to reduce the DC offset while still keeping the information present in the DC signal.

Although direct conversion receivers may attempt to reduce component count and power consumption, additional complex digital signal processing, and its accompanying cost is required. Simply reducing component count as with direct conversion, because system design complexity may increase, as well as cost, may not be the desired route. Furthermore, the digital baseband signal may have to be converted to an analog signal for some baseband processors.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for single sideband mixing receiver architecture for improving signal quality. Aspects of the method may comprise mixing a first input signal with a first local oscillator signal, via a first mixer, to generate a first mixed output signal, mixing a second input signal with a second local oscillator signal, via a second mixer, to generate a second mixed output signal, and generating a single sideband signal by adding the first mixed output signal and the second mixed output signal.

The second input signal may be 90° out of phase with the first input signal. Accordingly, the first input signal may comprise an I-channel intermediate frequency signal and the second input signal may comprise a Q-channel intermediate frequency signal. Alternatively, the first input signal may comprise a Q-channel intermediate frequency signal and the second input signal may comprise an I-channel intermediate frequency signal. The second oscillator signal may be 90° out of phase with the first oscillator signal.

The first input signal may be defined by $\cos(2\pi f_{in}t)$, in which $f_{in}$ is a base frequency of the first input signal, and the first local oscillator signal may be defined by $\cos(2\pi f_{lo}t)$, wherein $f_{lo}$ may be a base frequency of the first local oscillator signal. The first mixed output signal may then be defined by $\cos(2\pi f_{in}t)\cos(2\pi f_{lo}t)$. Similarly, the second input signal may be defined by $\sin(2\pi f_{in}t)$, wherein $f_{in}$ may be a base frequency of the second input signal. The second local oscillator signal may be defined by $\sin(2\pi f_{lo}t)$, wherein $f_{lo}$, which may be the base frequency of the first local oscillator signal, may also be a base frequency of the second local oscillator signal. The second mixed output signal may then be defined by $\sin(2\pi f_{in}t)\sin(2\pi f_{lo}t)$.

The two output signals may be added together, and the resulting single sideband signal may be defined by $\cos(2\pi f_{in}t)\cos(2\pi f_{lo}t)+\sin(2\pi f_{in}t)\sin(2\pi f_{lo}t)=\cos(2\pi(f_{in}-f_{lo})t)$.

Alternatively, the first input signal may be defined by $\sin(2\pi f_{in}t)$, wherein $f_{in}$ is a base frequency of the first input signal, and the first local oscillator signal may be defined by $\cos(2\pi f_{lo}t)$, wherein $f_{lo}$ may be a base frequency of the first local oscillator signal. The first mixed output signal may be defined by $\sin(2\pi f_{in}t)\cos(2\pi f_{lo}t)$. Similarly, the second input signal may be defined by $\cos(2\pi f_{in}t)$, wherein $f_{in}$ may be a base frequency of the second input signal. The second local oscillator signal may be defined by $\sin(2\pi f_{lo}t)$, wherein $f_{lo}$, which may be the base frequency of the first local oscillator signal, may also be a base frequency of the second local oscillator signal. The second mixed output signal may be defined by $-\sin(2\pi f_{in}t)\cos(2\pi f_{lo}t)$.

The two output signals may be added together, and the resulting single sideband signal may be defined by $\sin(2\pi f_{in}t)\cos(2\pi f_{lo}t)-\cos(2\pi f_{in}t)\sin(2\pi f_{lo}t)=\sin(2\pi(f_{in}-f_{lo})t)$.

Aspects of the system may comprise a first mixer to mix a first input signal with a first local oscillator signal to generate a first mixed output signal, and a second mixer to mix a second input signal with a second local oscillator signal to generate a second mixed output signal. A single sideband signal may be the result of adding the first mixed output signal and the second mixed output signal.

The second input signal may be 90° out of phase with the first input signal. Accordingly, the first input signal may comprise an I-channel intermediate frequency signal and the second input signal may comprise a Q-channel intermediate frequency signal. Alternatively, the first input signal may comprise a Q-channel intermediate frequency signal and the second input signal may comprise an I-channel intermediate frequency signal. The second oscillator signal may be 90° out of phase with the first oscillator signal.

The first input signal may be defined by $\cos(2\pi f_{in}t)$, in which $f_{in}$ is a base frequency of the first input signal, and the first local oscillator signal may be defined by $\cos(2\pi f_{lo}t)$, wherein $f_{lo}$ may be a base frequency of the first local oscillator signal. The first mixed output signal may then be defined by $\cos(2\pi f_{in}t)\cos(2\pi f_{lo}t)$. Similarly, the second input signal may be defined by $\sin(2\pi f_{in}t)$, wherein $f_{in}$ may be a base frequency of the second input signal. The second local oscillator signal may be defined by $\sin(2\pi f_{lo}t)$, wherein $f_{lo}$, which may be the base frequency of the first local oscillator signal, may also be a base frequency of the second local oscillator signal. The second mixed output signal may then be defined by $\sin(2\pi f_{in}t)\sin(2\pi f_{lo}t)$.

The two output signals may be added together, and the resulting single sideband signal may be defined by $\cos(2\pi f_{in}t)\cos(2\pi f_{lo}t)+\sin(2\pi f_{in}t)\sin(2f_{lo}t)=\cos(2\pi(f_{in}-f_{lo})t)$.

Alternatively, the first input signal may be defined by $\sin(2\pi f_{in}t)$, wherein $f_{in}$ is a base frequency of the first input signal, and the first local oscillator signal may be defined by $\cos(2\pi f_{lo}t)$, wherein $f_{lo}$ may be a base frequency of the first local oscillator signal. The first mixed output signal may be defined by $\sin(2\pi f_{in}t)\cos(2\pi f_{lo}t)$. Similarly, the second input signal may be defined by $\cos(2\pi f_{in}t)$, wherein $f_{in}$ may be a base frequency of the second input signal. The second local oscillator signal may be defined by $\sin(2\pi f_{lo}t)$, wherein $f_{lo}$, which may be the base frequency of the first local oscillator signal, may also be a base frequency of the second local oscillator signal. The second mixed output signal may be defined by $-\sin(2\pi f_{in}t)\cos(2\pi f_{lo}t)$.

The two output signals may be added together, and the resulting single sideband signal may be defined by $\sin(2\pi f_{in}t)\cos(2\pi f_{lo}t)-\cos(2\pi f_{in}t)\sin(2\pi f_{lo}t)=\sin(2\pi(f_{in}-f_{lo})t)$.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 5a is a block diagram illustrating an exemplary single sideband mixing circuit, in accordance with an embodiment of the invention.

FIG. 5b is a block diagram illustrating an alternate exemplary single sideband mixing circuit, in accordance with an embodiment of the invention.

FIG. 5c is a timing diagram illustrating exemplary local oscillator signals out of phase by 90° with each other, in accordance with an embodiment of the invention.

DETAILED DESCRIPTION OF THE INVENTION

Certain embodiments of the invention may be found in an analog zero-IF interface for GSM receivers. Various aspects of the invention may be utilized in, for example, a GSM receiver, which may be adapted to receive RF signals and downconvert the received RF signals to a very low intermediate frequency (VLIF) signal. The VLIF signal may be further downconverted to a baseband signal. Aspects of the invention may comprise amplifying the received RF signal, mixing the amplified RF signal down to a VLIF signal, filtering the VLIF signal, amplifying the VLIF signal, mixing the filtered VLIF signal to a baseband signal, and filtering the baseband signal.

Figure 1B:
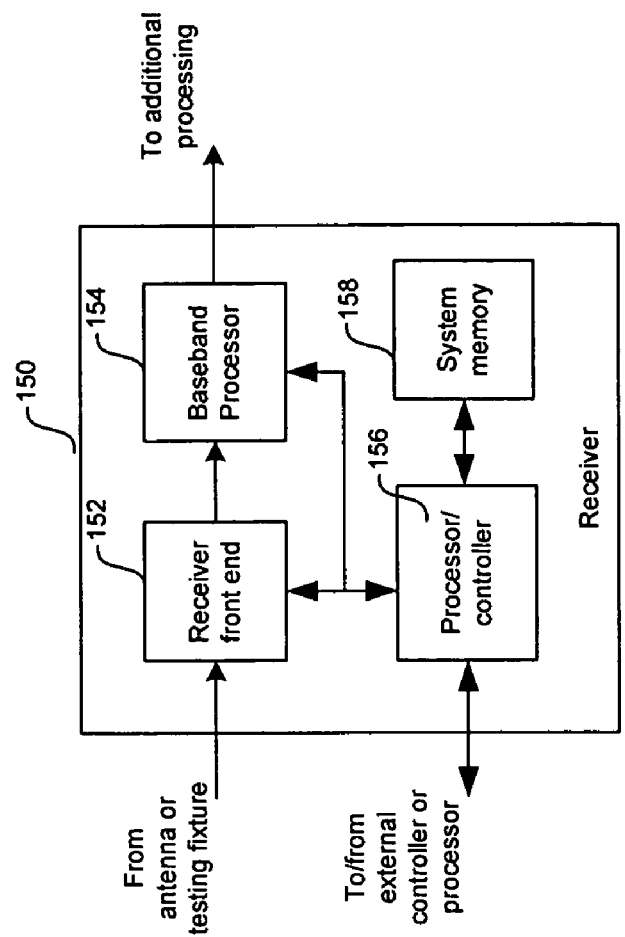
FIG. 1b is a block diagram of an exemplary RF receiver system that may be utilized in connection with an embodiment of the invention.
Figure 1A:
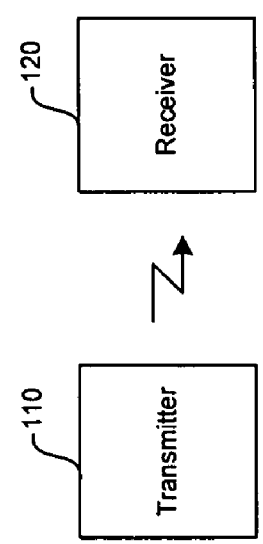
FIG. 1a is a block diagram of an exemplary transmitter system and a receiver system that may be utilized in connection with an embodiment of the invention.

FIG. 1a is a block diagram of an exemplary transmitter system and a receiver system. Referring to FIG. 1a, there is shown a transmitter block 110 and a receiver block 120. The transmitter block 110 may comprise suitable logic, circuitry, and/or code that may be adapted to filter and modulate a baseband signal to an RF signal, and transmit the RF signal. The receiver block 120 may comprise suitable logic, circuitry, and/or code that may be adapted to demodulate the RF signal to the baseband signal.

In operation, the transmission block 110 may be adapted to transmit RF signals over a wired or wireless medium. The receiver block 120 may be adapted to receive the RF signals and process it to a baseband signal that may be suitable for further processing, for example, as data or voice.

FIG. 1b is a block diagram of an exemplary RF receiver system, in accordance with an embodiment of the invention. Referring to FIG. 1b, the RF receiver system 150 may comprise a receiver front end 152, a baseband processor 154, a controller/processor 156, and a system memory 158. The receiver front end 152 may comprise suitable logic, circuitry, and/or code that may be adapted to receive an RF signal. The receiver front end 152 may be coupled to an external antenna for signal reception. The receiver front end 152 may demodulate a received signal before further processing. Moreover, the receiver front end 152 may comprise other functions, for example, filtering the received signal, amplifying the received signal, and/or downconverting the received signal to very low intermediate frequency (VLIF) signal and/or baseband signal. The receiver front end 152 may comprise a IF processor which may digitize an IF signal, and digitally process the digitized IF signal to filter and/or downconvert the digitized IF signal to a digital baseband signal. The IF processor may then convert the digitized baseband signal to an analog baseband signal.

The baseband processor 154 may comprise suitable logic, circuitry, and/or code that may be adapted to process analog baseband signals generated from the receiver front end (RFE) 152. The controller/processor 156 may comprise suitable logic, circuitry, and/or code that may be adapted to control the operations of the receiver front end 152 and/or the baseband processor 154. For example, the controller/processor 156 may be utilized to update and/or modify programmable parameters and/or values in a plurality of components, devices, and/or processing elements in the receiver front end 152 and/or the baseband processor 154. Control and/or data information may be transferred from at least one controller and/or processor external to the RF receiver system 100 (FIG. 1a) to the controller/processor 156. Similarly, the controller/processor 156 may transfer control and/or data information to at least one controller and/or processor external to the RF receiver system 100.

The controller/processor 156 may utilize the received control and/or data information to determine the mode of operation of the RFE 152. For example, the controller/processor 156 may select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the system memory 158 via the controller/processor 156. This information stored in system memory 158 may be transferred to the RFE 152 from the system memory 158 via the controller/processor 156. The system memory 158 may comprise suitable logic, circuitry, and/or code that may be adapted to store a plurality of control and/or data information, including parameters needed to calculate frequencies and/or gain, and/or the frequency value and/or gain value.

Figure 2:
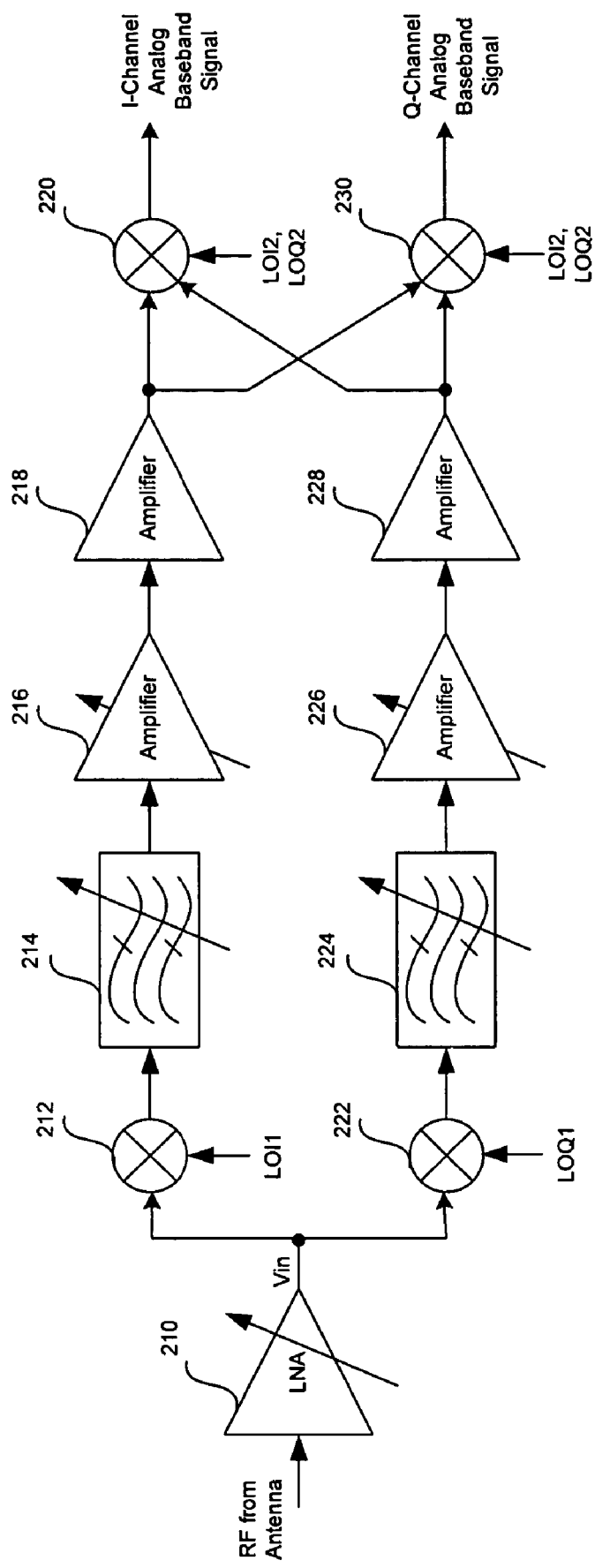
FIG. 2 is a block diagram illustrating an exemplary RF receiver front end using a single sideband receiver architecture to extract an analog baseband signal, in accordance with an embodiment of the invention.

FIG. 2 is a block diagram illustrating an exemplary RF receiver front end using a single sideband receiver architecture to extract an analog baseband signal, in accordance with an embodiment of the invention. Referring to FIG. 2, there is shown a low noise amplifier (LNA) 210, mixers 212, 222, 220 and 230, bandpass filters 214 and 224, programmable gain amplifiers (PGA) 216 and 226, and amplifiers 218 and 228. The LNA 210 may comprise suitable logic, circuitry, and/or code that may be adapted to amplify input signals and output the amplified signals. The LNA 210 may be utilized in instances where the signal to noise ratio (SNR) may be relatively low, such as, for example, RF signals received by an antenna.

The mixers 212 and 222 may comprise suitable logic, circuitry, and/or code that may be adapted to have as inputs two signals, and generate an output signal, which may be a difference of the frequencies of the two input signals and/or a sum of the frequencies of the two input signals.

The bandpass filters 214 and 224 may comprise suitable logic, circuitry, and/or code that may be adapted to selectively pass signals within a certain bandwidth while attenuating signals outside that bandwidth. The bandpass filters 214 and 224 may further comprise an amplifier circuit that may amplify the bandpass filtered signal, and the gain of the amplifier circuit may be controlled by a processor, such as, for example, a baseband processor 154 or a processor/controller 156.

The PGAs 216 and 226 may comprise suitable logic, circuitry, and/or code that may be adapted to amplify input signals and output the amplified signals. The gain of the amplifiers 216 and 226 may be controlled by a processor, such as, for example, a baseband processor 154 (FIG. 1b) or a processor/controller 156 (FIG. 1b). The gain of the PGAs 216 and 226 may be as high as, for example, 30 dB.

The amplifiers 218 and 228 may comprise suitable logic, circuitry, and/or code that may be adapted to amplify input signals and output the amplified signals. The gain of the amplifiers 216 and 226 may be amplify input signals and output the amplified signals. The amplifiers 218 and 228 may be fixed gain amplifiers, and the gain may be fixed, for example, at 15 dB.

The mixers 220 and 230 may comprise suitable logic, circuitry, and/or code that may be adapted to mix two input signals with two local oscillator input signals to produce an output signal that may be a difference of the frequencies of the two input signals and/or a sum of the frequencies of the two input signals. Additionally, the mixers 220 and 230 may reduce interferers/blockers around a desired bandwidth of the output signal by utilizing phase shifted input signals and phase shifted local oscillator signals. Interferers/blockers may be undesired signals that may interfere with and/or block a desired signal.

In operation, the RF signal, which may have a carrier frequency $f_{RF}$, may be received by an antenna and communicated to the LNA 210, where the RF signal may be amplified by the LNA 210. The amplified RF signal may be communicated to an input of the mixers 212 and 222. The mixers 212 and 222 may mix this amplified signal with local oscillator signals LOI1 and LOQ1, respectively. The outputs of the mixers 212 and 222 may be IF I and Q signals, respectively, and these signals may be at an intermediate frequency (IF).

The IF I and Q signals may be communicated to a bandpass filters 214 and 224, which may be adapted to pass the desired bandwidth of signals about the IF frequency, while attenuating the undesired frequencies in the IF signal, and may also amplify the desired bandwidth of signals. The filtered and amplified IF I and Q signals may be communicated to PGAs 216 and 226, and these signals may be amplified. The gain of the amplifier may be controlled by a processor, for example, a baseband processor 154 or a processor/controller 156. The amplified output signals IF I and IF Q of the bandpass filters 214 and 224 may be communicated to the amplifiers 218 and 228. The IF I and Q signals may be further amplified. The IF I signal generated at the output of the amplifier 218 may be communicated to an input of the mixers 220 and 230, and the IF Q signal at the output of the amplifier 228 may be communicated to another input of the mixers 220 and 230.

The mixers 220 and 230 may also be adapted to receive as inputs two local oscillator signals LOI2 and LOQ2. The four inputs at each mixer 220 and 230 may be mixed and combined by the mixers 220 and 230, respectively, to result in baseband I and Q signals, respectively, and these baseband signals may have less interferers/blockers at the desired bandwidth than if generated from a mixer similar to, for example, mixer 212 or 222.

Figure 3A:
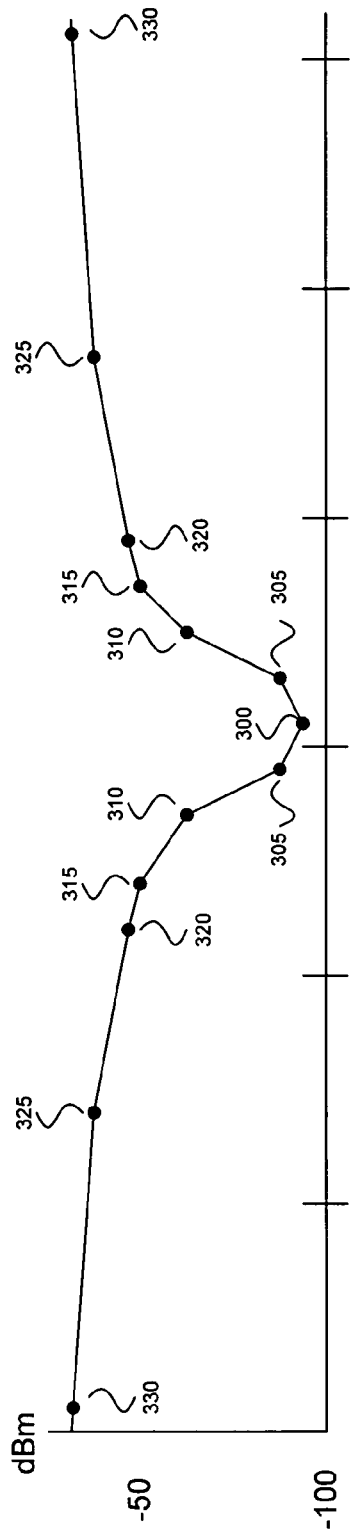
FIG. 3a is a graph illustrating strengths of exemplary desired signal and undesired interferers/blockers received by a receiving antenna, in connection with an embodiment of the invention.

FIG. 3a is a graph illustrating strengths of exemplary desired signal and undesired interferers/blockers as received by a receiving antenna, in connection with an embodiment of the invention. Referring to FIG. 3a, there is shown signals 300, 305, 310, 315, 320, 325, and 330. The signal 300 may be the desired signal and the other signals may be interferers/blockers that need to be attenuated. For example, the interferers/blockers 305, 310, 315, 320, 325 and 330 may be at harmonic frequencies of the desired signal 300.

Figure 3B:
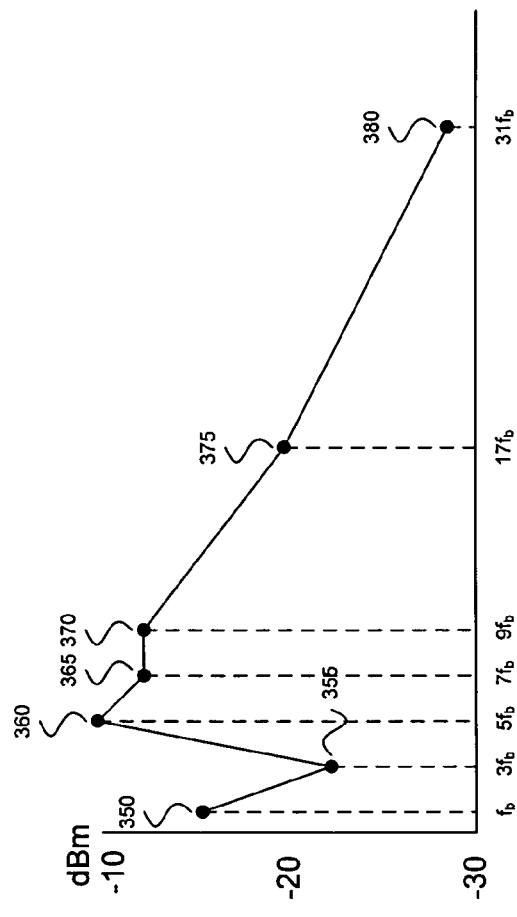
FIG. 3b is a graph illustrating strengths of exemplary desired signal and undesired interferers/blockers, for example, of FIG. 3a, after being downconverted to IF, filtered and amplified, in connection with an embodiment of the invention.

FIG. 3b is a graph illustrating strengths of exemplary desired signal and undesired interferers/blockers, for example, of FIG. 3a, after being downconverted to IF, filtered and amplified, in connection with an embodiment of the invention. Referring to FIG. 3b, there is shown signals 300, 305, 310, 315, 320, 325, and 330, which may have been bandpass filtered and amplified. The signal 300 may be the desired signal and the other signals may be the undesired interferers/blockers that need to be attenuated.

Ideally, a bandpass filter may be adapted to pass unattenuated only the frequencies that lie within a pass band and reject all other frequencies outside the pass band. However, normally, the bandpass filter passes the frequencies with some attenuation in the pass band and gradually attenuates the frequencies outside the pass band, with the frequencies farthest from the pass band being attenuated most. The desired signal 300 may have been passed by the bandpass filter, and amplified from −99 dBm (decibel-milliwatt) to −15 dBm, for a total gain of 84 dB. The undesired interferer/blocker 305 may have been attenuated by the bandpass filter such that when it was further amplified the resulting signal may have been amplified from −90 dBm to −24 dBm. Therefore, the total gain by the interferer/blocker 305 may be 66 dB.

Similarly, the interferer/blocker 310 may have been amplified from −58 dBm to −10 dBm for a 48 dB gain, and the interferer/blocker 315 may have been amplified from −50 dBm to −12 dBm for a 38 dB gain. The remaining interferers/blockers 320, 325 and 330 may have been amplified from −50 dBm to −13 dBm for a 37 dB gain, from −33 dBm to −21 dBm for 12 dB gain, and from −23 dBm to −28 dBm for a 5 dB attenuation.

Figure 4A:
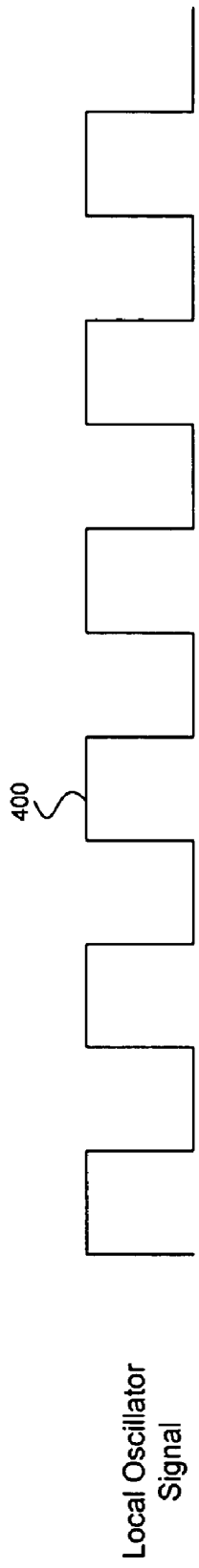
FIG. 4a is a timing diagram illustrating an exemplary local oscillator signal, which may be utilized in connection with an embodiment of the invention.

FIG. 4a is a timing diagram illustrating an exemplary local oscillator signal 400, in connection with an embodiment of the invention. Referring to FIG. 4a, there is shown a diagram illustrating a shape of the local oscillator signal, which may be a waveform in which there may be two states—a high state and a low state. The high state may represent a logic 1 and the low state may represent a logic 0, for example. The local oscillator signal may be an input to a mixer in which the mixer may mix the local oscillator signal with an input signal, for example, the signal illustrated in FIG. 3b.

Figure 4B:
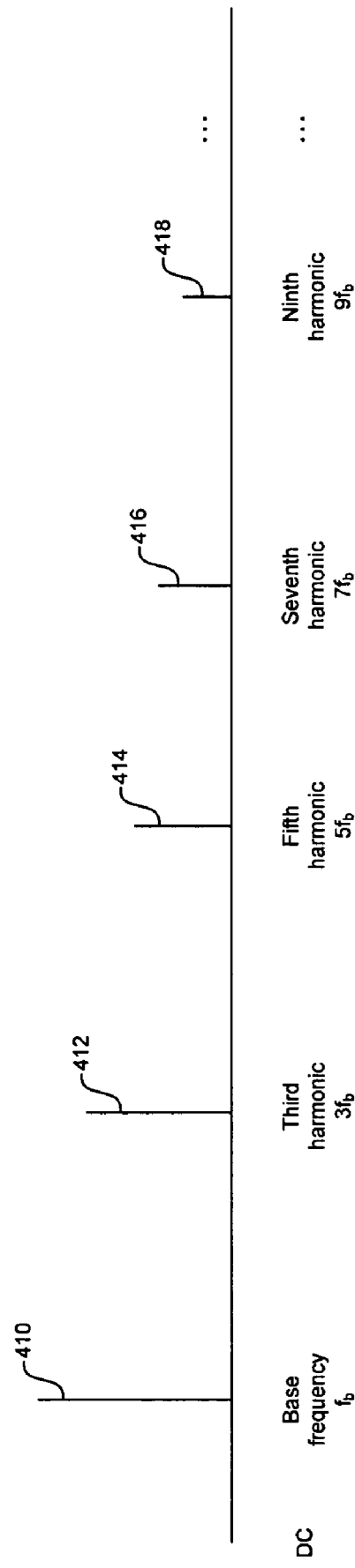
FIG. 4b is a graph illustrating frequency components of an exemplary local oscillator signal of FIG. 4a, for example, which may be utilized in connection with an embodiment of the invention.

FIG. 4b is a graph illustrating frequency components of an exemplary local oscillator signal of FIG. 4a, for example, in connection with an embodiment of the invention. Referring to FIG. 4b, there is shown a graph of the exemplary local oscillator signal with the base frequency 410 and odd harmonics of the base frequency 412, 414, 416, 418, . . . , that may be characteristic of the local oscillator signal illustrated in FIG. 4a. The signal strength of the odd harmonics 412, 414, 416, 418, . . . , may decrease as the frequency increases. Therefore, although it may be desirable to remove all odd harmonics, removing and/or attenuating those closest to the base frequency 410 may be most important.

Figure 4C:
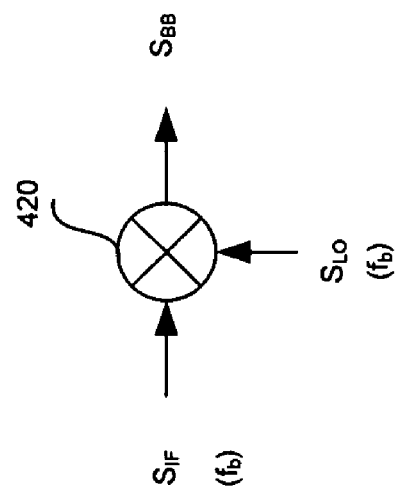
FIG. 4c is a block diagram illustrating an exemplary mixer mixing a single frequency input IF signal with a single frequency local oscillator signal, which may be utilized in connection with an embodiment of the invention.

FIG. 4c is a block diagram illustrating an exemplary mixer mixing a single frequency input IF signal with a single frequency local oscillator signal, in connection with an embodiment of the invention. Referring to FIG. 4c, there is shown a mixer 420 that may comprise suitable logic, circuitry and/or code that may be adapted mix two input signals and generate an output signal that may comprise frequencies that may be represented as a sum and a difference of frequencies of signals that are communicated to two inputs of the mixer 420.

An IF signal $S_{IF}$ may be communicated to one of the two inputs, and a local oscillator (LO) signal $S_{LO}$ may be communicated to the other of the two inputs, and an output signal $S_{BB}$ may be the output of the mixer 420. The IF signal $S_{IF}$ may comprise a single frequency $f_b$, and the LO signal $S_{LO}$ may also comprise a single frequency $f_b$. The base frequency of $f_b$ may be chosen for the LO signal $S_{LO}$ such that a DC baseband frequency may be generated when the desired base frequency $f_b$ of the IF signals $S_{IF1}$ and $S_{IF2}$ is mixed with the base frequency $f_b$ of the LO signal $S_{LO}$. The frequency $f_b$ may also be referred to as $f_{in}$. The output signal $S_{BB}$ may comprise frequencies that may be represented as a sum and a difference of the frequencies of the two signals $S_{IF}$ and $S_{LO}$. Therefore, the output signal $S_{BB}$ may comprise a signal at DC, the difference of the two frequencies, and a signal at $2f_b$, the sum of the two frequencies.

This may be illustrated by using cosine notation to represent the two signals $S_1$ and $S_2$, and mixing the two signals may be represented by multiplying the two signals $$S_1 = \cos(2\pi f_1 t)$$

$$S_2 = \cos(2\pi f_2 t)$$

$$\cos(2\pi f_1 t) \times \cos(2\pi f_2 t) = 0.5 \cos(2\pi(f_1+f_2)t) + 0.5 \cos(2\pi(f_1-f_2)t)$$

Figure 4D:
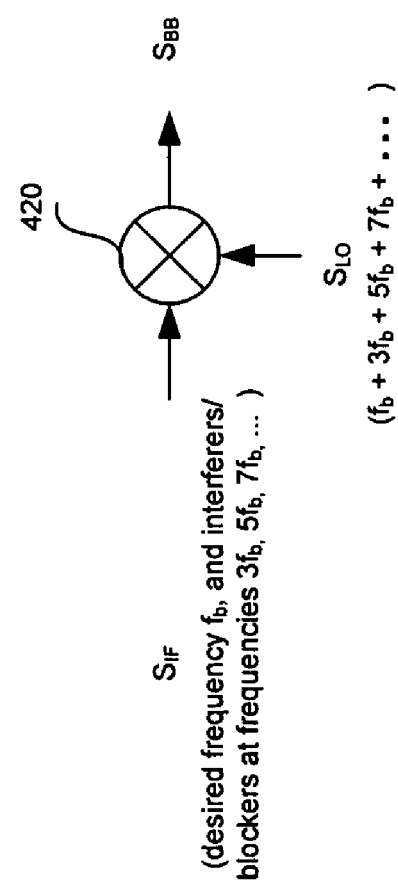
FIG. 4d is a block diagram illustrating an exemplary mixer mixing an exemplary input IF signal of FIG. 3b, for example, with an exemplary local oscillator signal of FIG. 4b, for example, which may be utilized in connection with an embodiment of the invention.

FIG. 4d is a block diagram illustrating an exemplary mixer mixing an exemplary input IF signal of FIG. 3b, for example, with an exemplary local oscillator signal of FIG. 4b, for example, in connection with an embodiment of the invention. Referring to FIG. 4d, there is shown a mixer 420 that may comprise suitable logic, circuitry and/or code that may be adapted mix two input signals and output a signal that may comprise frequencies that may be a sum and difference of frequencies of the two input signals.

An IF signal $S_{IF}$ may be communicated to a first of the two inputs, and a local oscillator (LO) signal $S_{LO}$ may be communicated to a second of the two inputs, and an output signal $S_{BB}$ may be generated by the mixer 420, in which an output baseband signal $S_{BB}'$ may be the desired component. The IF signal $S_{IF}$ may comprise a plurality of frequencies including a baseband frequency $f_b$ and interferers/blockers at various frequencies, for example, $3f_b$, $5f_b$, $7f_b$, $9f_b$, $17f_b$, $31f_b$. The LO signal $S_{LO}$ may comprise a plurality of frequencies, for example, a base frequency $f_b$ and odd harmonics of the base frequency $f_b$. For the base frequency of $f_b$, the third harmonic frequency may be $3f_b$, the fifth harmonic frequency may be $5f_b$, the seventh harmonic frequency may be $7f_b$, etc. The mixer may output a signal that may comprise a sum and a difference of component frequencies of the IF signal $S_{IF}$ and the plurality of frequencies of the LO signal $S_{LO}$. Therefore, the output signal $S_{BB}$ may comprise a plurality of frequencies due to two signal components resulting from mixing of each frequency of the IF signal $S_{IF}$ with each frequency of the LO signal $S_{LO}$, in which a DC baseband signal of the output signal $S_{BB}$ may be desired to be further processed.

For example, the frequency components due to the baseband frequency $f_b$ of the IF signal $S_{IF}$ mixed with the base frequency $f_b$ in the LO signal $S_{LO}$ may be DC and $2f_b$. Similarly, mixing the baseband frequency $f_b$ of the IF signal $S_{IF}$ with the harmonics of the LO signal $S_{LO}$ may result in frequency components at $2f_b$ and $4f_b$ for the third harmonic, frequency components at $4f_b$ and $6f_b$ for the fifth harmonic, frequency components at $6f_b$ and $8f_b$ for the seventh harmonic, frequency components at $8f_b$ and $10f_b$ for the ninth harmonic, etc.

Similarly, the interferer/blocker at frequency $3f_b$ of the IF signal $S_{IF}$ may be mixed with the LO signal $S_{LO}$ to result in frequency components at $2f_b$ and $4f_b$ for the base frequency $f_b$ in the LO signal $S_{LO}$, at DC and $6f_b$ for the third harmonic in the LO signal $S_{LO}$, at $2f_b$ and $8f_b$ for the fifth harmonic in the LO signal $S_{LO}$, at $4f_b$ and $10f_b$ for the seventh harmonic in the LO signal $S_{LO}$, etc.

The interferer/blocker at frequency $5f_b$ of the IF signal $S_{IF}$ may be mixed with the LO signal $S_{LO}$ to result in frequency components at $4f_b$ and $6f_b$ for the base frequency $f_b$ in the LO signal $S_{LO}$, at $2f_b$ and $8f_b$ for the third harmonic in the LO signal $S_{LO}$, at DC and $10f_b$ for the fifth harmonic in the LO signal $S_{LO}$, at $2f_b$ and $12f_b$ for the seventh harmonic in the LO signal $S_{LO}$, etc.

Accordingly, there may be a DC component in the output signal $S_{BB}$ due to each odd harmonic of the LO signal $S_{LO}$. These interfering components at the DC baseband may distort the information in the output baseband signal $S_{BB}'$.

FIG. 5a is a block diagram illustrating an exemplary single sideband mixing circuit, in accordance with an embodiment of the invention. Referring to FIG. 5a, there is shown two mixers 500 and 510 that may comprise suitable logic, circuitry and/or code that may be adapted mix two input signals and generate an output signal that may comprise frequencies that may be represented as a sum and a difference of frequencies of the two signals.

An IF signal $S_{IF1}$ may be communicated to a first of the two inputs of the mixer 500, and a local oscillator (LO) signal $S_{LO1}$ may be communicated to a second of the two inputs of the mixer 500. An IF signal $S_{IF2}$ that may be 90° out of phase with the IF signal $S_{IF1}$ may be communicated to a first of the two inputs of the mixer 510, and a local oscillator (LO) signal $S_{LO2}$ that may be 90° out of phase with the local oscillator (LO) signal $S_{LO1}$ may be communicated to a second of the two inputs of the mixer 510. The outputs of the mixers 500 and 510 may be coupled together, and the output signals of the mixers 500 and 510 may add together to form the output signal $S_{BB}$, in which an output baseband signal $S_{BB}'$ may be the desired component.

The IF signals $S_{IF1}$ and $S_{IF2}$ and the LO signals $S_{LO1}$ and $S_{LO2}$ may be represented by using sine and cosine notations to represent the two signals, and mixing the two signals may be represented by multiplying the two signals. Therefore, the IF signal $S_{IF1}$ may be represented as $$S_{IF1} = \cos(2\pi f_b t)$$

and since the IF signal $S_{IF2}$ may be 90°, or $\pi/2$ radians, out of phase with the IF signal $S_{IF1}$, the IF signal may be represented as $$S_{IF2} = \cos(2\pi f_b t - \pi/2) = \sin(2\pi f_b t).$$

Similarly, the LO signals $S_{LO1}$ and $S_{LO2}$ may be represented as $$S_{LO1} = \cos(2\pi f_{LO} t)$$

$$S_{LO2} = \cos(2\pi f_{LO} t - \pi/2) = \sin(2\pi f_{LO} t).$$

The output signals of the mixers 500 and 510 may then be represented as $\cos(2\pi f_b t)\cos(2\pi f_{LO} t)$ and $\sin(2\pi f_b t)\sin(2\pi f_{LO} t)$, respectively. Therefore, the output of the mixer 500 added to the output of the mixer 510 may be represented as $$S_{BB} = \cos(2\pi f_b t)\cos(2\pi f_{LO} t) + \sin(2\pi f_b t)\sin(2\pi f_{LO} t) = \cos(2\pi(f_b - f_{LO})t)$$

When the output signals of the two mixers 500 and 510 are added together, the result may be that only one sideband is generated, rather than two sidebands that may result from the output of one mixer as illustrated, for example, in FIG. 4c.

The IF signals $S_{IF1}$ and $S_{IF2}$ may comprise a plurality of frequencies including a desired base frequency $f_b$ and undesired interferers/blockers at various frequencies, for example, $3f_b$, $5f_b$, $7f_b$, $9f_b$, $17f_b$, $31f_b$. The LO signals $S_{LO1}$ and $S_{LO2}$ may also comprise a plurality of frequencies, for example, a base frequency $f_b$ and odd harmonics of the base frequency $f_b$. The base frequency of $f_b$ may be chosen for the LO signals $S_{LO1}$ and $S_{LO2}$ such that a DC baseband frequency may be generated when the desired base frequency $f_b$ of the IF signals $S_{IF1}$ and $S_{IF2}$ is mixed with the base frequency $f_b$ of the LO signals $S_{LO1}$ and $S_{LO2}$. For the base frequency of $f_b$ of the LO signals $S_{LO1}$ and $S_{LO2}$, the third harmonic frequency may be $3f_b$, the fifth harmonic frequency may be $5f_b$, the seventh harmonic frequency may be $7f_b$, etc. Therefore, the output signal $S_{BB}$ may comprise a plurality of frequencies due to mixing of each frequency of the IF signal $S_{IF}$ with each frequency of the LO signal $S_{LO}$, in which a DC baseband signal of the output signal $S_{BB}$ may be desired to be further processed.

Since mixing of the IF signal $S_{IF}$ with the base frequency $f_b$ of the LO signal $S_{LO}$ may be represented as $S_{BB}=\cos(2\pi(f_b-f_{LO})t)$, the frequencies generated may be $f_b-f_b=0$ or DC, $4f_b$, $6f_b$, etc. However, when the harmonics of the LO signal $S_{LO}$ are considered, additional phase differences must be taken in to account. Since the frequency of the third harmonic of the LO signal $S_{LO}$ is tripled, the phase difference of the third harmonic is also tripled with respect to the base frequency of the LO signal $S_{LO}$. Therefore, the third harmonic may be described by $$\sin(2\pi(3f_b t)+\pi)=-\sin(2\pi(3f_b t)).$$

The addition of $\pi$, which is equivalent to 180°, is because the third harmonic has a phase difference of 270° versus the phase difference of 90° for the base frequency. The third harmonic has an extra phase difference of 180°. Therefore, the equation describing the sum of the outputs of the two mixers may then be $$S_{BB}=\cos(2f_b t)\cos(2f_{LO}t)-\sin(2f_b t)\sin(2\pi f_{LO}t)=\cos(2\pi(f_b+f_{LO})t)$$

The frequencies generated due to the third harmonic of the LO signal $S_{LO}$ may be a sum of the two frequencies of the IF signal $S_{IF}$ and the LO signal $S_{LO}$. Similarly, the fifth harmonic of the LO signal $S_{LO}$ may be subtracted from the frequencies of the IF signal $S_{IF}$, the seventh harmonic of the LO signal $S_{LO}$ may be added to the frequencies of the IF signal $S_{IF}$, etc.

Therefore, the frequencies generated due to the IF signal $S_{IF}$ mixed with the third harmonic frequency $3f_b$ of the LO signal $S_{LO}$ may be $4f_b$, $6f_b$, $8f_b$, etc. The frequencies generated due to the IF signal $S_{IF}$ mixed with the fifth harmonic frequency $5f_b$ of the LO signal $S_{LO}$ may be $4f_b$, $2f_b$, DC, $2f_b$, $4f_b$, etc. Accordingly, where there may be at least one DC component in the output signal $S_{BB}$ from each odd harmonic of the LO signal $S_{LO}$ in the single mixer implementation illustration of FIG. 4d, only every other odd harmonic of the LO signal $S_{LO}$ may contribute a DC component to the output signal $S_{BB}$. Therefore, the interfering components at the DC baseband that may distort the information in the output baseband signal $S_{BB}'$ may have been reduced by half.

FIG. 5b is a block diagram illustrating an alternate exemplary single sideband mixing circuit, in accordance with an embodiment of the invention. Referring to FIG. 5b, there is shown two mixers 500 and 510 that may comprise suitable logic, circuitry and/or code that may be adapted mix two input signals and output a signal that may comprise frequencies that may be represented as a sum and a difference of frequencies of the two signals.

An IF signal $S_{IF1}$ may be communicated to a first of the two inputs of the mixer 500, and a local oscillator (LO) signal $S_{LO1}$ may be communicated to a second of the two inputs of the mixer 500. An IF signal $S_{IF2}$ that may be 90° out of phase with the IF signal $S_{IF1}$ may be communicated to a first of the two inputs of the mixer 510, and a local oscillator (LO) signal $S_{LO2}$ that may be 90° out of phase with the local oscillator (LO) signal $S_{LO1}$ may be communicated to a second of the two inputs of the mixer 510. The outputs of the mixers 500 and 510 may be coupled together, and the output signals of the mixers 500 and 510 may add together to form the output signal $S_{BB}$, in which an output baseband signal $S_{BB}'$ may be the desired component.

The IF signals $S_{IF1}$ and $S_{IF2}$ and the LO signals $S_{LO1}$ and $S_{LO2}$ may be represented by using sine and cosine notations to represent the two signals, and mixing the two signals may be represented by multiplying the two signals. As an alternative to FIG. 5a, however, the IF signal $S_{IF1}$ may be represented by a sine function $$S_{IF1}=\sin(2\pi f_b t)$$

and since the IF signal $S_{IF2}$ may be 90° (or $\pi/2$ radians) out of phase with the IF signal $S_{IF1}$, the IF signal may be represented as $$S_{IF2}=\sin(2\pi f_b t+\pi/2)=\cos(2\pi f_b t).$$

The LO signals $S_{LO1}$ and $S_{LO2}$ may be represented as in FIG. 5a $$S_{LO1}=\cos(2\pi f_{LO}t)$$

$$S_{LO2}=\cos(2\pi f_{LO}t-\pi/2)=\sin(2\pi f_{LO}t).$$

The outputs of the mixers 500 and 510 may then be sin $(2\pi f_b t)\cos(2\pi f_{LO}t)$ and $\cos(2\pi f_b t)\sin(2\pi f_{LO}t)$, respectively. Therefore, the output of the mixer 500 may be added to the negative output of the mixer 510 and the result may be represented as $$S_{BB}=\sin(2\pi f_b t)\cos(2\pi f_{LO}t)-\cos(2\pi f_b t)\sin(2\pi f_{LO}t)=\sin(2\pi(f_b-f_{LO})t)$$

When the positive output of the mixer 500 is added to the negative output of the mixer 510, the result is that only one sideband is generated, rather than two sidebands that are generated from the output of one mixer as illustrated, for example, in FIG. 4c. Therefore, similarly as illustrated in FIG. 5b, only every other odd harmonic of the LO signal $S_{LO}$ may contribute a DC component to the output signal $S_{BB}$. This may result in the number of interfering components at the DC baseband, which may distort the information in the output baseband signal $S_{BB}'$, being reduced by half.

FIG. 5c is a timing diagram illustrating exemplary local oscillator signals out of phase by 90° with each other, in accordance with an embodiment of the invention. Referring to FIG. 5c, there is shown local oscillator (LO) signals $S_{LO1}$ 520 and $S_{LO2}$ 530. LO signal $S_{LO1}$ 520 may be a waveform in which there may be two states—a high state and a low state. The high state may represent a logic 1 and the low state may represent a logic 0, for example. The LO signal $S_{LO2}$ 530 may be 90° out of phase with respect to the LO signal $S_{LO1}$ 520. One method of generating the LO signal $S_{LO2}$ 530 may comprise delaying the LO signal $S_{LO1}$ 520 by one clock cycle, for example, by utilizing a flip-flop, in which the clock signal to the flip-flop may have a frequency that may be four times the frequency of the LO signal $S_{LO1}$ 520.

Figure 6:
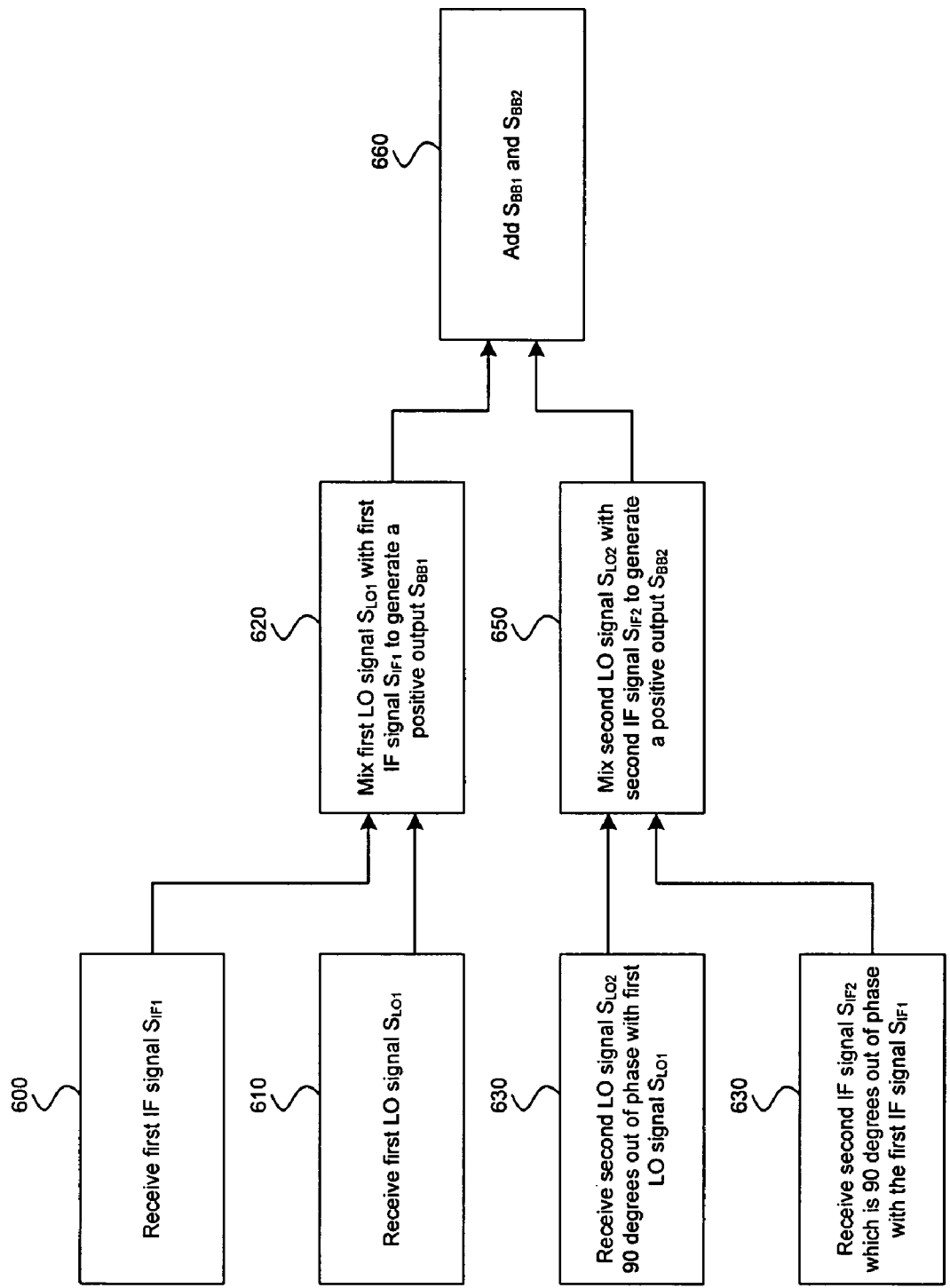
FIG. 6 is an exemplary flow diagram of an exemplary single sideband mixing circuit used to extract a single sideband I channel baseband signal, in accordance with an embodiment of the invention.

FIG. 6 is an exemplary flow diagram of an exemplary single sideband mixing circuit used to extract an I channel baseband signal, in accordance with an embodiment of the invention. Referring to FIG. 6, there is shown a plurality of steps 600 to 660 that may be utilized to demodulate a received I channel IF signal to a single sideband I channel baseband signal. In step 600, a first IF signal $S_{IF1}$, which may be represented as $\cos(2\pi f_b t)$, may be received at a first mixer. In step 610, a first local oscillator (LO) signal $S_{LO1}$, which may be represented as $\cos(2\pi f_{LO} t)$, may be received at the first mixer. In step 620, the two signals may be mixed in the first mixer, and the output of the mixer may be $\cos(2\pi f_b t)\cos(2\pi f_{LO} t)$.

In step 630, a second IF signal $S_{IF2}$ may be received at a second mixer, and the second IF signal $S_{IF2}$ may be 90°, or $\pi/2$ radians, out of phase with respect to the first IF signal $S_{IF1}$. The second IF signal $S_{IF2}$ may be represented as $\cos(2\pi f_b t - \pi/2) = \sin(2\pi f_b t)$. In step 640, a second local oscillator (LO) signal $S_{LO2}$ may be received at the first mixer, which may be 90° out of phase with respect to the first local oscillator signal $S_{LO1}$, and may be similarly represented as $\sin(2\pi f_{LO} t)$. Step 650 may mix the two signals in the second mixer, and the output may be $\sin(2\pi f_b t)\sin(2\pi f_{LO} t)$. In step 660, the outputs of the first mixer and the second mixer may be added together, and the resulting output may be a single sideband I channel baseband signal represented by $\cos(2\pi f_b t)\cos(2\pi f_{LO} t) + \sin(2\pi f_b t)\sin(2\pi f_{LO} t) = \cos(2\pi (f_b - f_{LO}) t)$.

Figure 7:
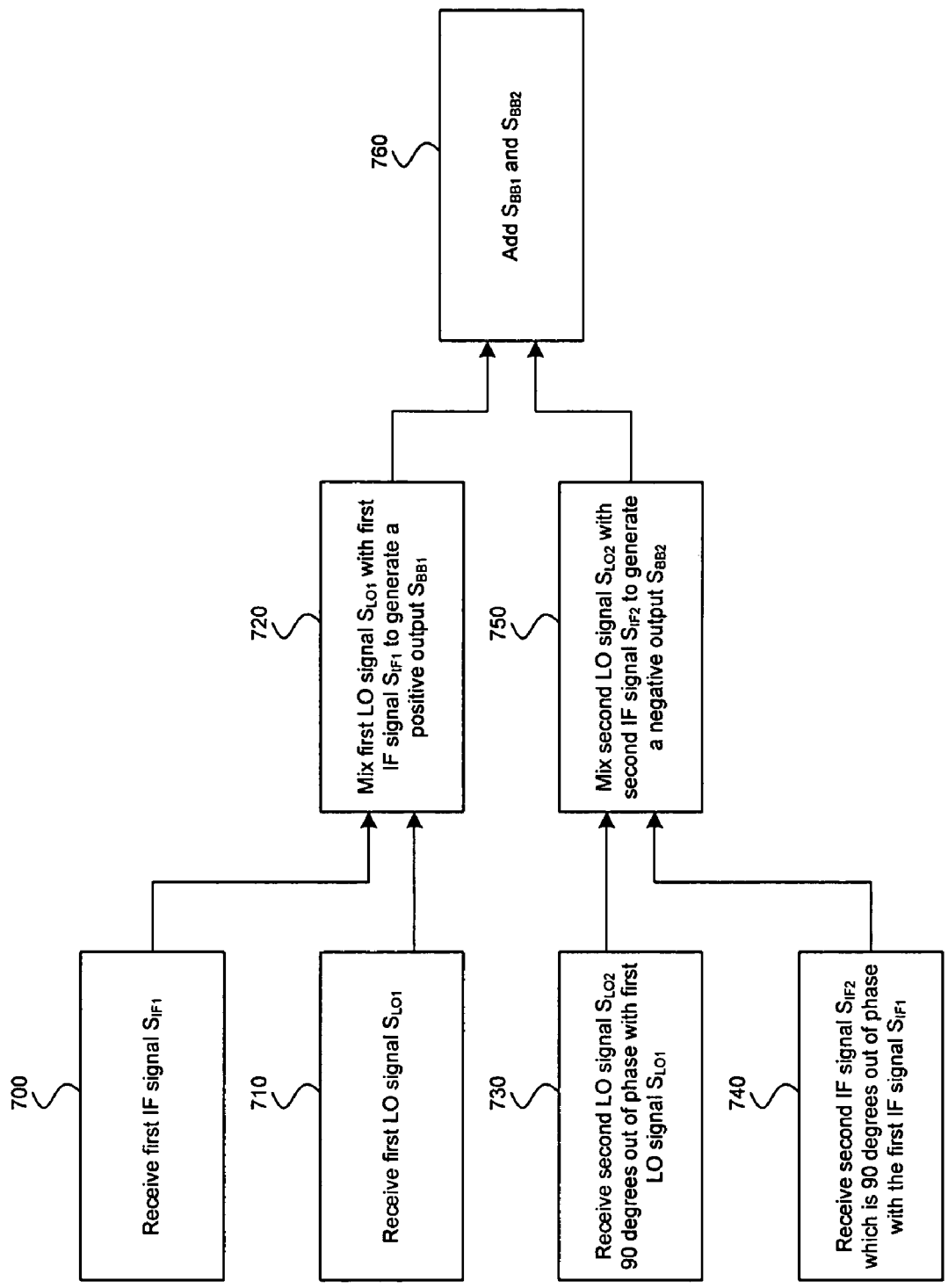
FIG. 7 is an exemplary flow diagram of an exemplary single sideband mixing circuit used to extract a single sideband Q channel baseband signal, in accordance with an embodiment of the invention.

FIG. 7 is an exemplary flow diagram of an exemplary single sideband mixing circuit used to extract a Q channel baseband signal, in accordance with an embodiment of the invention. Referring to FIG. 7, there is shown a plurality of steps 700 to 760 that may be utilized to demodulate a received Q channel IF signal to a single sideband Q channel baseband signal. In step 700 a first IF signal $S_{IF1}$ may be received at a first mixer, and it may be represented as $\sin(2\pi f_b t)$. In step 710, a first local oscillator (LO) signal $S_{LO1}$ may be received at the first mixer, and it may be represented as $\cos(2\pi f_{LO} t)$. In step 720, the two signals may be mixed in the first mixer and the resulting output may be $\sin(2\pi f_b t)\cos(2\pi f_{LO} t)$.

In step 730, a second IF signal $S_{IF2}$ may be received at a second mixer, and it may be 90°, or $\pi/2$ radians, out of phase with respect to the first IF signal $S_{IF1}$. The second IF signal $S_{IF2}$ may be represented as $\sin(2\pi f_b t + \pi/2) = \cos(2\pi f_b t)$. In step 740, a second local oscillator (LO) signal $S_{LO2}$ may be received at the second mixer, which may be 90° out of phase with respect to the first local oscillator signal $S_{LO1}$, and may be represented as $\cos(2\pi f_{LO} t - \pi/2) = \sin(2\pi f_{LO} t)$. In step 750 the two signals may be mixed in the second mixer, and a negative output may be $-\cos(2\pi f_b t)\sin(2\pi f_{LO} t)$. In step 760, the outputs of the first mixer and the second mixer may be added together, and the resulting output may be a single sideband Q channel baseband signal represented by $\sin(2\pi f_b t)\cos(2\pi f_{LO} t) - \cos(2\pi f_b t)\sin(2\pi f_{LO} t) = \sin(2\pi (f_b - f_{LO}) t)$.

The exemplary mixer circuit illustrated in FIG. 5a and corresponding inputs may be representative of mixer 220 (FIG. 2) used for the I channel path. Similarly, the exemplary mixer circuit illustrated in FIG. 5b, and corresponding inputs, may be the mixer 230 (FIG. 2) used for the Q channel path. Although, the illustrations in FIG. 2, FIG. 5a, FIG. 5b, FIG. 6 and FIG. 7 may show specific implementations, the invention need not be so limited.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for reducing interference in a signal, the method comprising:

downconverting a global system for mobile communications (GSM) signal from a radio frequency (RF) signal to a very low intermediate frequency (VLIF) signal;

amplifying the VLIF signal using at least a first amplifier, a second amplifier and a third amplifier, the first amplifier being a first programmable amplifier of a programmable bandpass filter, the second amplifier being a second programmable amplifier, the third amplifier being a fixed amplifier;

mixing a first input signal that is derived from the amplified VLIF signal with a first local oscillator signal to generate a first mixed signal, the first input signal comprising at least a first VLIF signal, the first local oscillator signal having a selectable frequency;

mixing a second input signal that is derived from the amplified VLIF signal with a second local oscillator signal to generate a second mixed signal, the second input signal comprising at least a second VLIF signal;

adding said first mixed signal and said second mixed signal to generate a first mixed output signal, which is a first analog single sideband baseband signal;

mixing said first input signal with said second local oscillator signal to generate a third mixed signal;

mixing said second input signal with said first local oscillator signal to generate a fourth mixed signal; and subtracting said third mixed signal from said fourth mixed signal to generate a second mixed output signal, which is a second analog single sideband baseband signal.

2. The method according to claim 1, wherein said second input signal is 90° out of phase with said first input signal.

3. The method according to claim 1, wherein said first input signal comprises an I-channel VLIF signal.

4. The method according to claim 1, wherein said second input signal comprises a Q-channel VLIF signal.

5. The method according to claim 1, wherein said first input signal comprises a Q-channel VLIF signal.

6. The method according to claim 1, wherein said second input signal comprises an I-channel VLIF signal.

7. The method according to claim 1, wherein said first input signal and said second input signal are defined by $\cos(2\pi f_{in}t)$ and $\sin(2\pi f_{in}t)$, respectively, wherein $f_{in}$ is a base frequency of said first input signal and said second input signal.

8. The method according to claim 7, wherein said first local oscillator signal and said second local oscillator signal are defined by $\cos(2\pi f_{lo}t)$ and $\sin(2\pi f_{lo}t)$, respectively, wherein $f_{lo}$ is a base frequency of said first local oscillator signal and said second local oscillator signal.

9. The method according to claim 8, wherein said first mixed signal is defined by $\cos(2\pi f_{in}t)\cos(2\pi f_{lo}t)$.

10. The method according to claim 8, wherein said second mixed signal is defined by $\sin(2\pi f_{in}t)\sin(2\pi f_{lo}t)$.

11. The method according to claim 10, wherein said first mixed output signal is defined by $\cos(2\pi f_{in}t)\cos(2\pi f_{lo}t)+\sin(2\pi f_{lo}t)=\cos(2\pi(f_{in}-f_{lo})t)$.

12. The method according to claim 8, wherein said fourth mixed signal is defined by $\sin(2\pi f_{in}t)\cos(2\pi f_{lo}t)$.

13. The method according to claim 8, wherein said third mixed signal is defined by $\cos(2\pi f_{in}t)\sin(2\pi f_{lo}t)$.

14. The method according to claim 13, wherein said second mixed output signal is defined by $\sin(2\pi f_{in}t)\cos(2\pi f_{lo}t)-\cos(2\pi f_{in}t)\sin(2\pi f_{lo}t)=\sin(2\pi(f_{in}-f_{lo})t)$.

15. The method according to claim 1, wherein said second oscillator signal comprises a Q-channel local oscillator signal that is 90° out of phase with respect to said first oscillator signal, which comprises an I-channel local oscillator signal.

16. The method according to claim 1, wherein said first mixed output signal comprises an I-channel analog baseband signal.

17. The method according to claim 1, wherein said second mixed output signal comprises a Q-channel analog baseband signal.

18. A system for reducing interference in a signal, the system comprising:
one or more circuits comprising a downconverter, a first amplifier of a bandpass filter, a second amplifier, a third amplifier, a first mixer, a second mixer, a third mixer, and a fourth mixer, wherein:
said downconverter downconverts a global system for mobile communications (GSM) signal from a radio frequency (RB signal to a very low intermediate frequency (VLIF) signal;
said first amplifier of said bandpass filter, said second amplifier and said third amplifier amplifying the VLIF signal, wherein said first amplifier is a first programmable amplifier of a programmable bandpass filter, wherein the second amplifier is a second programmable amplifier, wherein the third amplifier is a fixed amplifier;
said first mixer mixes a first input signal that is derived from the amplified VLIF signal with a first local oscillator signal to generate a first mixed signal, the first input signal comprising at least a first VLIF signal, the first local oscillator signal having a selectable frequency;
said second mixer mixes a second input signal that is derived from the amplified VLIF signal with a second local oscillator signal to generate a second mixed signal the second input signal comprising at least a second VLIF signal;
said one or more circuits adds said first mixed signal and said second mixed signal to generate a first mixed output signal, which is a first analog single sideband baseband signal;
said third mixer mixes said first input signal with said second local oscillator signal to generate a third mixed signal;
said fourth mixer mixes said second input signal with said first local oscillator signal to generate a fourth mixed signal; and
said one or more circuits subtracts said third mixed signal from said fourth mixed signal to generate a second mixed output signal, which is a second analog single sideband baseband signal.

19. The system according to claim 18, wherein said second input signal is 90°0 out of phase with said first input signal.

20. The system according to claim 18, wherein said first input signal comprises an I-channel VLIF signal.

21. The system according to claim 18, wherein said second input signal comprises a Q-channel VLIF signal.

22. The system according to claim 18, wherein said first input signal comprises a Q-channel VLIF signal.

23. The system according to claim 18, wherein said second input signal comprises an I-channel intermediate frequency VLIF signal.

24. The system according to claim 18, wherein said first input signal and said second input signal are defined by $\cos(2\pi f_{in}t)$ and $\sin(2\pi f_{in}t)$, respectively, wherein $f_{in}$ is a base frequency of said first input signal and said second input signal.

25. The system according to claim 24, wherein said first local oscillator signal and said second local oscillator signal are defined by $\cos(2\pi f_{lo}t)$ and $\sin(2\pi f_{lo}t)$, respectively, wherein $f_{lo}$ is a base frequency of said first local oscillator signal and said second local oscillator signal.

26. The system according to claim 25, wherein said first mixed signal is defined by $\cos(2\pi f_{in}t)\cos(2\pi f_{lo}t)$.

27. The system according to claim 25, wherein said second mixed signal is defined by $\sin(2\pi f_{in}t)\sin(2\pi f_{lo}t)$.

28. The system according to claim 27, wherein said first mixed output signal is defined by $\cos(2\pi f_{in}t)\cos(2\pi f_{lo}t)+\sin(2\pi f_{lo}t)=\cos(2\pi(f_{in}-f_{lo})t)$.

29. The system according to claim 25, wherein said fourth mixed output signal is defined by $\sin(2\pi f_{in}t)\cos(2\pi f_{lo}t)$.

30. The system according to claim 25, wherein said third mixed output signal is defined by $\cos(2\pi f_{in}t)\sin(2\pi f_{lo}t)$.

31. The system according to claim 30, wherein said second mixed output signal is defined by $\sin(2\pi f_{in}t)-\cos(2\pi f_{lo}t)\sin(2\pi f_{lo}t)=\sin(2\pi(f_{in}-f_{lo})t)$ 32. The system according to claim 18, wherein said second oscillator signal comprises a Q-channel local oscillator signal that is 90° out of phase with respect to said first oscillator signal, which comprises an I-channel local oscillator signal.

33. The system according to claim 18, wherein said first mixed output signal comprises an I-channel analog baseband signal.

34. The system according to claim 18, wherein said second mixed output signal comprises a Q-channel analog baseband signal.

35. A system for reducing interference in a signal, the system comprising:
one or more circuits operable to perform at least the following:
downconvert a global system for mobile communications (GSM) signal from a radio frequency (RF) signal to a very low intermediate frequency (VLIF) signal;
amplify the VLIF signal using at least a first amplifier, a second amplifier and a third amplifier, the first amplifier being a first programmable amplifier of a programmable bandpass filter, the second amplifier being a second programmable amplifier, the third amplifier being a fixed amplifier;

generate a first analog single sideband baseband signal based on processing: a first input signal that is derived from the amplified VLIF signal and a first local oscillator signal, the first input signal comprising at least a first VLIF signal, the first local oscillator signal having a selectable frequency, and a second input signal that is derived from the amplified VLIF signal and a second local oscillator single; and generate a second analog single sideband baseband signal based on processing: said first input signal and said second local oscillator signal, and said second input signal and said first local oscillator signal.

36. The system according to claim 35, wherein said second input signal is 90° out of phase with said first input signal.

37. The system according to claim 35, wherein said second single sideband baseband signal is 90° out of phase with said first single sideband baseband signal.

38. The system according to claim 35, wherein said second local oscillator signal is 90° out of phase with said first local oscillator signal.

39. The system according to claim 35, wherein said first input signal and said second input signal are defined by $\cos(2\pi f_{in}t)$ and $\sin(2\pi f_{in}t)$, respectively, wherein $f_{in}$ is a base frequency of said first input signal and said second input signal.

40. The system according to claim 39, wherein said first local oscillator signal and said second local oscillator signal are defined by $\cos(2\pi f_{lo}t)$ and $\sin(2\pi f_{lo}t)$, respectively, wherein $f_{lo}$ is a base frequency of said first local oscillator signal and said second local oscillator signal.

41. The system according to claim 40, wherein said first single sideband baseband signal is defined by $\cos(2\pi f_{in}t)\cos(2\pi f_{lo}t) + \sin(2\pi f_{in}t)\sin(2\pi f_{lo}t) = \cos(2\pi(f_{in}-f_{lo})t)$.

42. The system according to claim 40, wherein said second single sideband baseband signal is defined by $\sin(2\pi f_{in}t)\cos(2\pi f_{lo}t) - \cos(2\pi f_{in}t)\sin(2\pi f_{lo}t) = \sin(2\pi(f_{in}-f_{lo})t)$.

43. The system according to claim 35, wherein said first single sideband baseband signal comprises an I-channel analog baseband signal.

44. The system according to claim 39, wherein said second single sideband baseband signal comprises a Q-channel analog baseband signal.

* * * * *

UNITED STATES PATENT AND TRADEMARK OFFICE
CERTIFICATE OF CORRECTION

| | | |
|---|---|---|
| PATENT NO. | : 7,583,947 B2 | Page 1 of 1 |
| APPLICATION NO. | : 10/977869 | |
| DATED | : September 1, 2009 | |
| INVENTOR(S) | : Meng-An Michael Pan | |

It is certified that error appears in the above-identified patent and that said Letters Patent is hereby corrected as shown below:

Column 15, line 44 delete "(RB" and insert --(RF)--.

Column 16, line 12 delete "90°0" and insert --90°--.

Column 16, line 20 delete "intermediate frequency".

Column 16, lines 44-45 delete "$\sin(2\pi f_{in}t)\text{-}\cos(2\pi f_{lo}t)\sin(2\pi f_{lo}t) = \sin(2\pi(f_{in}\text{-}f_{lo})t)$" and insert --$\sin(2\pi f_{in}t)\cos(2\pi f_{lo}t)\text{-}\cos(2\pi f_{in}t)\sin(2\pi f_{lo}t) = \sin(2\pi(f_{in}\text{-}f_{lo})t)$.--.

Column 18, line 44 delete "claim 39" and insert --claim 35--.

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,583,947 B2 | Page 1 of 1 |
| APPLICATION NO. | : 10/977869 | |
| DATED | : September 1, 2009 | |
| INVENTOR(S) | : Meng-An Michael Pan | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 530 days.

Signed and Sealed this

Second Day of November, 2010

David J. Kappos
*Director of the United States Patent and Trademark Office*